US006504562B2

(12) United States Patent
Kojima

(10) Patent No.: US 6,504,562 B2
(45) Date of Patent: Jan. 7, 2003

(54) METHOD OF COMPENSATION IN THERMAL RECORDING

(75) Inventor: Tetsuya Kojima, Kanagawa (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 10/023,829

(22) Filed: Dec. 21, 2001

(65) Prior Publication Data

US 2002/0080222 A1 Jun. 27, 2002

(30) Foreign Application Priority Data

Dec. 21, 2000 (JP) ....................................... 2000-388465

(51) Int. Cl.7 ........................... B41J 2/36; H04N 1/401; H04N 1/40

(52) U.S. Cl. ....................................................... 347/188

(58) Field of Search ............... 347/188, 19; 400/120.09

(56) References Cited

U.S. PATENT DOCUMENTS 4,827,279 A * 5/1989 Lubinsky et al. ........... 347/188
6,018,355 A 1/2000 Kuwabara

FOREIGN PATENT DOCUMENTS

JP 9/234899 9/1997
JP 11-320933 11/1999
JP 2001-119576 * 4/2001 .......... H04N/1/401

* cited by examiner

*Primary Examiner*—Huan H. Tran
(74) *Attorney, Agent, or Firm*—Sughrue Mion, PLLC

(57) ABSTRACT

The thermal recording compensation method performs photoelectric reading of a recorded image on a thermal recording material to construct unevenness data and uses the unevenness data to perform unevenness compensation. The unevenness data constructed by said photoelectric reading is used in the unevenness compensation after the unevenness data is subjected to filtering for frequency enhancement.

7 Claims, 3 Drawing Sheets

METHOD OF COMPENSATION IN THERMAL RECORDING

BACKGROUND OF THE INVENTION

This invention relates to a method of compensation in thermal recording. More particularly, it relates to a method of performing compensation in thermal recording with thermal recording apparatus by which the unevenness of a recorded image on a film is measured optically and compensated on the basis of the result of measurement.

Image recording apparatus that perform image recording on recording media with a thermal head are used extensively. In this type of image recording apparatus, a thermal recording material as a recording medium is pressed against a line thermal head having a multiple of heat-generating elements arranged in a 1D direction and as they are individually controlled in accordance with image data, the thermal recording material is transported in a direction perpendicular to the 1D direction, thereby recording the desired 2D gradation image.

The formation of various gradation images is depicted in FIG. 4A. An image with a gradation (D) of 1 is formed by heating the heat-generating elements for t seconds. An image with D=2 is formed by heating for 2 t seconds. Similarly, images with D=3, 4 and 5 are formed by heating for 3 t, 4 t and 5 t seconds.

As a result, pixels are formed on the thermal recording material and the area of color formation is gradation-dependent within the range of one pixel width in the direction of transport (see FIG. 4B), whereby a gradation image is recorded. While recording is performed by pulse-width modulation in the case under consideration, it should be noted that gradation images can also be recorded by pulse-number modulation in essentially the same manner.

If image is recorded using image data for the same specified recording density (gradation), so-called shading occurs from the thermal printer as unevenness in the recording density (a problem generally characterized in that image density is the highest in the center area of the thermal head in the direction in which the glaze extends but gradually decreases toward either end). So-called shading compensation is effected in order to correct this unevenness in density that occurs in the above-described type of image recording.

To perform shading compensation, image is recorded using image data for the same specified recording density and the density of the recorded image is measured optically and on the basis of the measured recording density, shading compensation data are preliminarily computed to enable subsequent compensation of the image data such that the actually recorded image will have a uniform density, and the image data for the recorded image is compensated using the computed shading compensation data.

Since the problem of shading in the thermal recording apparatus results from the thermal head, the site of occurrence of uneven densities in the recorded image does not change. On the other hand, the intensity of unevenness varies with many factors including the recording density of the image data, the temperature of the thermal head and the speed at which image recording is done (the transport speed of the heat-sensitive material relative to the thermal head) and it has been difficult to compensate shading with high precision.

This problem was previously addressed by the assignee and a solution has been proposed in Japanese Patent Application No. 8-42969 "Thermal Recording Apparatus" (see JP 9-234899 A). Functionally, the proposed technology uses two essential portions, one being a correcting data storage portion which holds image data shading compensation data and weighting functions for weighting the correction coefficients for shading compensation, and the other being an image processing portion which weights the shading compensation data on the basis of the weighting functions, computes the correction coefficients for shading compensation and performs shading compensation on the image data.

As it turned out, however, this method of shading compensation based on optical measurements involves a new problem. That is, if the recorded image has uneven densities at high frequencies, they cannot be completely followed by the measuring optics and only "dull" results occur.

If the result of measurement is "dull", it is clear that no further satisfactory result can be obtained by performing shading compensation on the thermal recording apparatus using the compensation data constructed on the basis of such "dull" result.

The present invention has been accomplished under these circumstances and its principal object is to improve the method of compensation in thermal recording with thermal recording apparatus of a type that performs optical measurement of the unevenness in the density of a recorded image on a film and which corrects the unevenness of image density on the basis of the result of the measurement. More particularly, the invention provides an improved method of compensation in thermal recording which is adapted to assure satisfactory compensation for uneven densities that occur at high frequencies in the thermal recording apparatus.

SUMMARY OF THE INVENTION

In order to attain the object described above, the present invention provides a method of compensation in thermal recording comprising the steps of: performing photoelectric reading of a recorded image on a thermal recording material to construct unevenness data; and using the unevenness data to perform unevenness compensation, wherein the unevenness data constructed by the photoelectric reading is used in the unevenness compensation after the unevenness data is subjected to filtering for frequency enhancement.

Preferably, the filtering for the frequency enhancement of the unevenness data is such that a low-frequency component of the unevenness data is left as it is but a high-frequency component of the unevenness data is enhanced.

Preferably, the filtering for the frequency enhancement of the unevenness data is such that low-frequency component of the unevenness data is left as it is but high-frequency component of the unevenness data is enhanced and linear interpolation in a degree of the frequency enhancement in accordance with a frequency is effected between the low-frequency component and the high-frequency component.

Preferably, the filtering for the frequency enhancement of the unevenness data is performed by mathematical operations on digital data.

Preferably, the unevenness data is constructed by performing the photoelectric reading of the recorded image in which the thermal recording is performed on the thermal recording material using image data for an identical specified recording density.

Preferably, the unevenness compensation is shading compensation.

In order to attain the object described above, the present invention provides a method of compensation in thermal recording comprising the steps of: performing the thermal recording on a thermal recording material using image data representing an image having a uniform density; performing photoelectric reading of a recorded image on the thermal recording material to construct unevenness data; subjecting the unevenness data to filtering for frequency enhancement; and using the unevenness data subjected to the filtering to perform unevenness compensation of a thermal recording image.

DESCRIPTION OF THE PREFERRED EMBODIMENT

A preferred embodiment of the present invention is described below in detail with reference to accompanying FIGS. 1–3. The following description is directed to a case where the concept of the invention is applied to a thermal recording apparatus which performs thermal recording on a thermal film.

The thermal recording apparatus which implements the compensation method of the invention according to its preferred embodiment uses a thermal film F having a heat-sensitive recording layer formed on one side of a transparent base such as a transparent polyethylene terephthalate (PET) film. The apparatus consists basically of a loading section where a magazine containing a plurality of thermal films F is loaded, a feed/transport section which picks up one thermal film F from the magazine in the loading section and transports it to a recording section which performs thermal recording on the transfer film F by means of a thermal head to be described later, and an ejecting section through which the thermal film F with a recorded image is ejected to the outside of the apparatus.

The loading section has basically an inlet through which the magazine containing a plurality of thermal films F is inserted into the recording apparatus and a magazine guide mechanism. The feed/transport section takes thermal films F one by one out of the magazine in the loading section by such means as a sheet feeding mechanism using a sucker and sends each thermal film F to the recording section by the transport means.

The recording section is composed of a cleaning roller pair, a thermal head, and a platen roller and associated transport means (i.e., roller pairs and guides). As the platen roller rotates at a specified image recording speed while holding the thermal film F in a specified orientation, said thermal film F is transported in a so-called auxiliary scanning direction and subjected to image recording with the thermal head.

Figure 2:
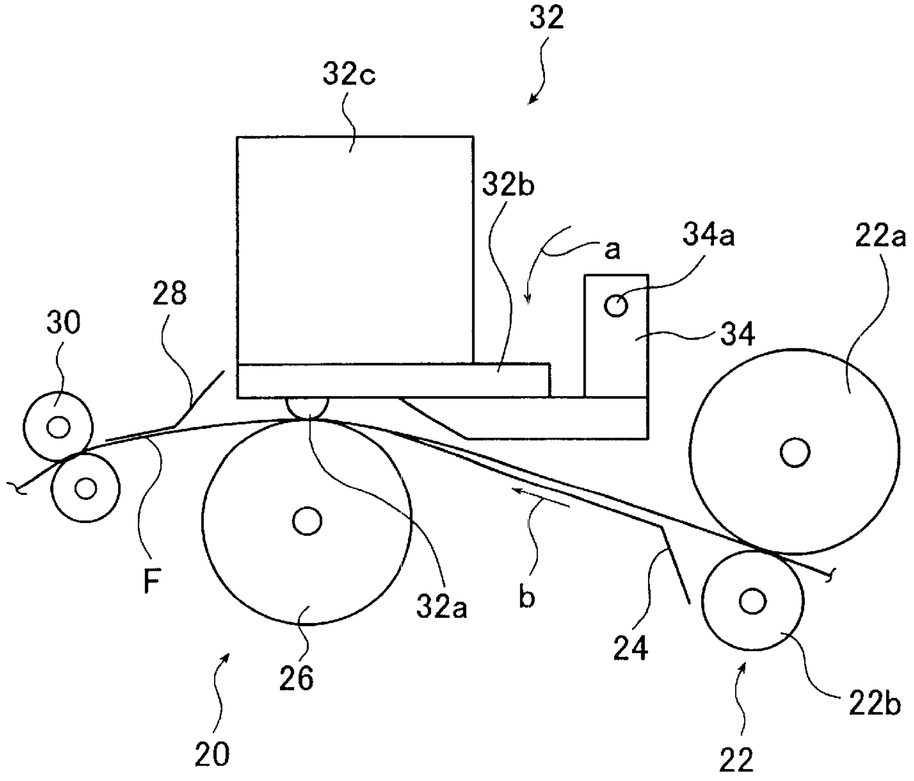
FIG. 2 shows schematically the construction of a recording section which is the essential part of a thermal recording apparatus which implements the method of the invention for compensation in thermal recording.

FIG. 2 shows the general layout of the recording section. The illustrated recording section 20 comprises basically a thermal head 32, a platen roller 26, a cleaning roller pair 22, guides 24 and 28 and a transport roller pair 30. The thermal head 32 is capable of thermal recording at a recording (pixel) density of, say, about 300 dpi on thermal films of, for example, up to B4 size. The thermal head 32 comprises a body 32*b* having a glaze in which a multiple of heat-generating elements arranged in one direction (normal to the paper on which FIG. 2 is drawn) to effect thermal recording for one line, and a heat sink 32*c* fixed to the body 32*b*. The thermal head 32 is supported on a support member 34 that can pivot about a fulcrum 34*a* either in the direction of arrow a or in the reverse direction.

As already mentioned, the platen roller 26 rotates at a specified image recording speed while holding the thermal film F in a specified orientation so that it is transported in a so-called auxiliary scanning direction (generally perpendicular to the direction in which the glaze extends). The cleaning roller pair 22 consists of an adhesive rubber roller 22*a* and a non-adhesive roller 22*b*.

Having described its layout, we now describe the recording operation of the thermal recording apparatus in the preferred embodiment. When a command for record START is issued, the thermal film F is taken out of the magazine and transported toward the recording section by the transport means until it reaches a regulating roller pair (not shown) provided just upstream of the cleaning roller pair 22. At the regulating roller pair, the thermal film F stays for a moment and the temperature of thermal head 32 is checked. If it has reached a specified level, the thermal film F starts again to be transported by the regulating roller pair and moves into the recording section 20.

Initially (before transport of the thermal head F starts), the support member 34 has pivoted to UP position (in the direction opposite to the direction of arrow a) so that the glaze 32*a* of the thermal head 32 is not in contact with the platen roller 26. When its transport by the regulating roller pair starts, the thermal film F is first pinched by the cleaning roller pair 22 and transported as it is guided by the guide 24.

When the forward end of the thermal film F has reached the record START position (corresponding to the glaze 32*a* of the thermal head 32), the support member 34 pivots in the direction of arrow a and the thermal film F becomes pinched between the glaze 32*a* and the platen roller 26 such that the glaze 32*a* is pressed onto the heat-sensitive recording layer of the thermal film F. Then, as already mentioned, the thermal film F is transported in the direction of arrow b by means of the platen roller 26, the regulating roller pair, the transport roller pair 30, etc. as it is held in a specified orientation by the platen roller 26.

During this transport, the respective heat-generating elements in the glaze 32*a* are heated in accordance with the data for the image to be recorded, thereby performing thermal recording on the thermal film F. In the embodiment under consideration, control of thermal recording in accordance with this image data involves shading compensation as outlined below with reference to the process flowchart shown in FIG. 1.

To begin with, thermal recording is performed with the thermal head 32 using image data representing the original image having a uniform density, that is, image data for an identical specified recording density (step 11). The density of the recorded image is measured with an optical instrument (step 12). The measured data is compensated by a predetermined filtering process (step 13).

In step 11, thermal recording is performed with the thermal head 32 by an ordinary method. In step 12, the density of the recorded image may be measured with a sensor comprising a light emitter in combination with a light receiver and the value of the resulting photocurrent is A/D converted to obtain digital readout data.

Figure 3A:
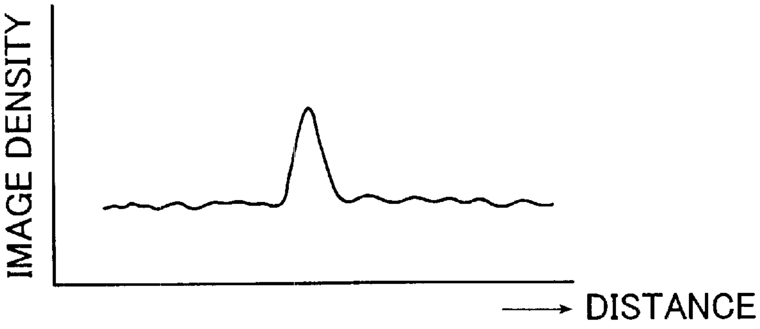
FIG. 3A is a diagram showing how data for a recorded image has become dull in the process of readout.

For the sake of convenience in explanation, an example of the result of density measurement in step 12 is shown in FIG. 3A as an analog value before A/D conversion. As already mentioned, the problem here with the result of density measurement is that its high-frequency component has been measured in a "dull" state.

Figure 3B:
FIG. 3B is a diagram showing the original readout data.

Even if the actual recorded image as measured for density should provide the result shown in FIG. 3B, the result of an ordinary optical measurement is affected by several undesired phenomena such as the spread of reading light to produce so-called "dull" data as shown in FIG. 3A. In an extreme case, the degree of dullness is such that the peak value is reduced to about one half of what it should be.

Figure 1:
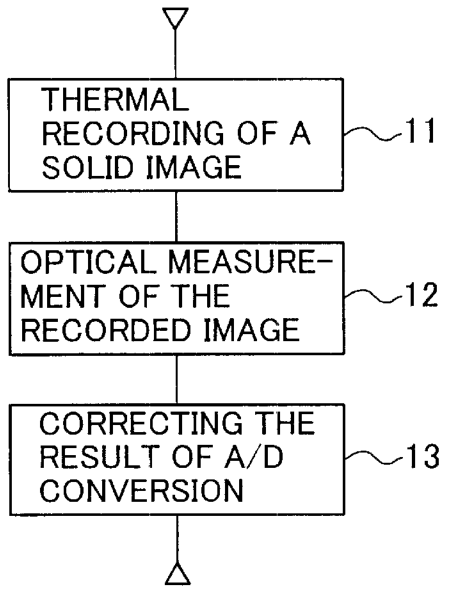
FIG. 1 is a process flowchart for an exemplary method of compensation in thermal recording according to the invention.

To deal with this problem, the dull result of measurement has to be brought back to the initial state by performing the filtering process in step 13 (see FIG. 1). In the embodiment under consideration, the correct result of measurement is obtained by applying a predetermined digital filter to the result of A/D conversion and performing appropriate multiplications and additions.

Figure 3C:
FIG. 3C is a diagram showing the result of correcting the data in FIG. 3A by the method of the invention.
Figure 4A:
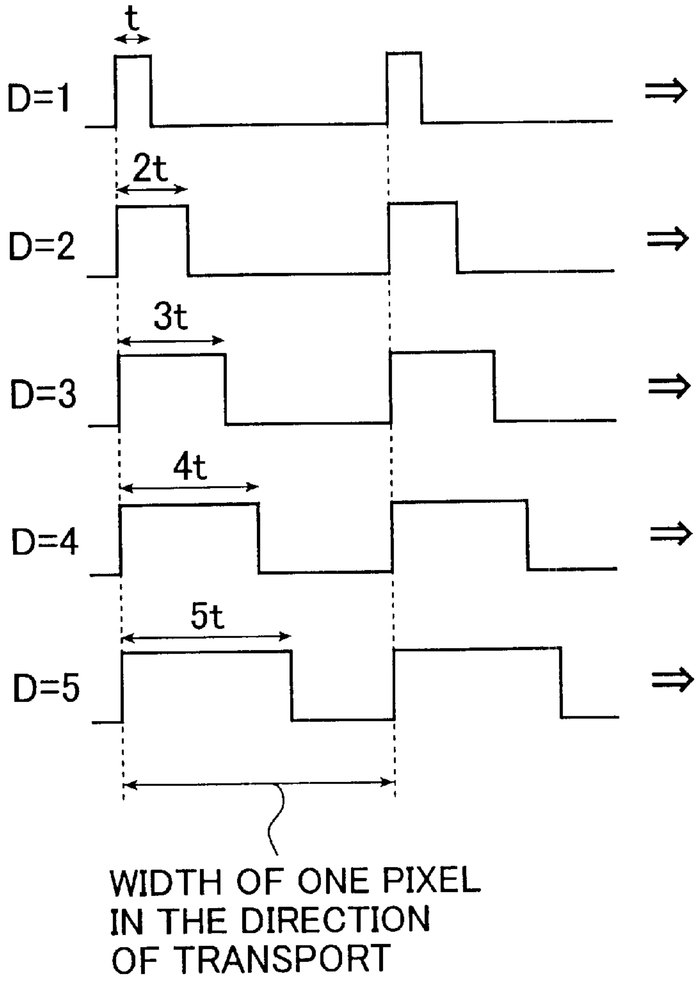
FIG. 4A illustrates drive signals for performing the conventional method of compensation by pulse-width modulation.
Figure 4B:
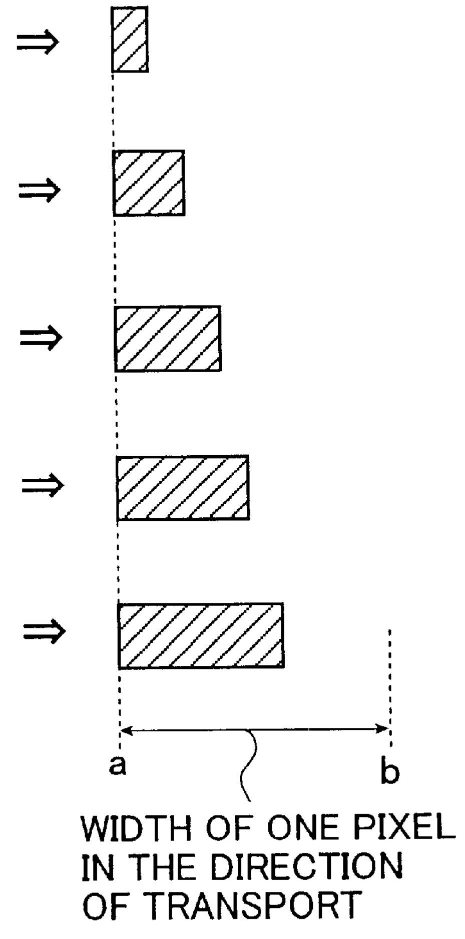
FIG. 4B illustrates the pixels formed by application of those drive signals.

Without dullness, the result of measurement should have been as shown in FIG. 3B but as it turned out, the actual result was "dull" as shown in FIG. 3A. In a case like this, the data shown in FIG. 3A is subjected to A/D conversion and a digital filter (0.0, −0.5, 2.0, −0.5, 0.0) is applied to the resulting digital data, whereby the data can be corrected as shown in FIG. 3C.

Needless to say, "2.0" in the digital filter corresponds to the peak value of the data shown in FIG. 3A. In the embodiment under consideration, the digital filter has the values 0.0, −0.5, 2.0, −0.5, 0.0. In principle, the values of the digital filter can appropriately be chosen from tables consisting of frequency-dependent settings.

To be more specific, the digital filter leaves low-frequency image data (low-frequency component of the digital readout data) as such whereas it enhances high-frequency image data (high-frequency component of the digital readout data). Intermediate image data between the low-frequency image data and the high-frequency image data is preferably processed by linear interpolation in a degree (level) of the frequency enhancement according to the frequency of the digital readout image data (in a frequency-dependent manner).

Described above is just one example of the configuration of the digital filter. Specific values of the digital filter may be determined on a trial-and-error basis. Alternatively, generalized or representative values may be chosen from the accumulation of the results of past measurements.

The foregoing embodiment has the advantage that even if data for a recorded image are measured with the high-frequency component becoming "dull" as shown in FIG. 3A due, for example, the spread of reading light, such "dull" data can be corrected to a state almost like the original data.

While the present invention has been described above with reference to the preferred embodiment, it should be understood that this is not the sole case of the invention and various improvements and modifications may of course be made without departing from the spirit and scope of the invention.

For instance, the aforementioned control of thermal recording in accordance with the data for the image to be recorded may include the various, image recording speed-dependent, control operations that are disclosed in commonly assigned JP 11-320933 A "Thermal Recording Apparatus", for example, controlling the supply voltage to the thermal head, controlling the pressing force of the thermal head, controlling the position at which the thermal head is pressed, and controlling the number of groups into which the heat-generating elements to be energized are divided.

As described above in detail, the present inventions offers the advantage that it can realize a method of compensation in thermal recording which is adapted to assure satisfactory compensation for uneven densities that occur at high frequencies in the thermal recording apparatus.

Specifically, the invention offers the following practical advantage: the density of a recorded image is measured optically and the result is subjected to A/D conversion, followed by application of a digital filter to revert the dull portion of the digital data to the original state, thereby realizing correct shading compensation.

What is claimed is:

1. A method of compensation in thermal recording comprising the steps of:

performing photoelectric reading of a recorded image on a thermal recording material to construct unevenness data; and using said unevenness data to perform unevenness compensation, wherein said unevenness data constructed by said photoelectric reading is used in said unevenness compensation after said unevenness data is subjected to filtering for frequency enhancement.

2. The method according to claim 1, wherein said filtering for the frequency enhancement of said unevenness data is such that a low-frequency component of said unevenness data is left as it is but a high-frequency component of said unevenness data is enhanced.

3. The method according to claim 1, wherein said filtering for the frequency enhancement of said unevenness data is such that a low-frequency component of said unevenness data is left as it is but a high-frequency component of said unevenness data is enhanced and a linear interpolation in a degree of said frequency enhancement in accordance with a frequency is effected between said low-frequency component and said high-frequency component.

4. The method according to claim 1, wherein said filtering for the frequency enhancement of said unevenness data is performed by mathematical operations on digital data.

5. The method according to claim 1, wherein said unevenness data is constructed by performing the photoelectric reading of the recorded image in which the thermal recording is performed on said thermal recording material using image data for an identical specified recording density.

6. The method according to claim 1, wherein said unevenness compensation is shading compensation.

7. A method of compensation in thermal recording comprising the steps of:

performing thermal recording on a thermal recording material using image data representing an image having a uniform density;

performing photoelectric reading of a recorded image on said thermal recording material to construct unevenness data;

subjecting said unevenness data to filtering for frequency enhancement; and using said unevenness data subjected to the filtering to perform unevenness compensation of a thermal recording image.

* * * * *